United States Patent [19]

Kataoka et al.

[11] Patent Number: 4,605,706
[45] Date of Patent: Aug. 12, 1986

[54] PROCESS FOR PRODUCING A CHELATE RESIN

[75] Inventors: Yushin Kataoka; Masaaki Matsuda; Kenji Ochi; Masahiro Aoi, all of Niihama, Japan

[73] Assignee: Sumitomo Chemical Company, Limited, Osaka, Japan

[21] Appl. No.: 738,369

[22] Filed: May 28, 1985

Related U.S. Application Data

[62] Division of Ser. No. 525,473, Aug. 22, 1983, Pat. No. 4,564,659.

[30] Foreign Application Priority Data

Sep. 1, 1982 [JP] Japan .................. 57-153028

[51] Int. Cl.$^4$ .............................................. C08F 8/32
[52] U.S. Cl. ...................... 525/340; 525/345; 525/346; 525/347; 525/349; 525/351; 525/359.3; 525/375; 525/377; 525/379; 525/380
[58] Field of Search .............. 525/340, 345, 346, 347, 525/349, 351, 359.3, 375, 377, 379, 380

[56] References Cited

U.S. PATENT DOCUMENTS

| | | | |
|---|---|---|---|
| 2,671,076 | 3/1954 | Price | 526/310 |
| 3,088,799 | 5/1963 | Fetscher | 23/14.5 |
| 3,823,204 | 7/1974 | Okada et al. | 526/310 |
| 3,878,170 | 4/1975 | Panzer et al. | 526/311 |
| 4,062,787 | 12/1977 | Jolivet et al. | 526/310 |
| 4,350,801 | 9/1982 | Grasshoff | 526/311 |

OTHER PUBLICATIONS

Anal. Chem. 52, 967–972, (1980).
J. Polymer Sci. Polymer Chemistry Ed. 19, 2869–2880 (1981).
Die Macromolecular Chemie 152, 43–47, (1972).

*Primary Examiner*—Joseph L. Schofer
*Assistant Examiner*—Bernard Lipman
*Attorney, Agent, or Firm*—Stevens, Davis, Miller & Mosher

[57] ABSTRACT

A chelate resin having a functional group of the formula:

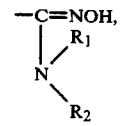

wherein $R_1$ and $R_2$ are each independently hydrogen, alkyl, aminoalkyl, phenyl or a substituted group thereof and another functional group of the formula:

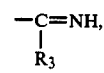

wherein $R_3$ is amino, alkylamino, polyethylenepolyamino, hydrazo, hydrazino, hydrazono, amidino, guanidino, semicarbazide or a substituted group thereof, has an excellent adsorption capacity for metal ions.

3 Claims, No Drawings

PROCESS FOR PRODUCING A CHELATE RESIN

This is a division of application Ser. No. 525,473, filed Aug. 22, 1983, now U.S. Pat. No. 4,564,659.

This invention relates to a chelate resin and a process for producing the same.

Chelate resins are very useful for the purification of industrial water, the treatment of waste water, the recovery of valuable metal elements, and the like because when they are used, metal ions can selectively be removed from a liquid containing the metal ions.

It has heretofore been well known that a resin having amidoxime groups is produced by reacting a resin having nitrile groups with hydroxylamine and/or a derivative thereof, and that the thus obtained resin satisfactorily adsorbs metal ions such as uranium, gold, iron, mercury, copper, lead and the like (U.S. Pat. No. 3,088,799, Published Unexamined Japanese Patent Application Nos. 53,593/76, and 126,088/78). However, said chelate resin has small adsorption capacity and is desired to be improved in this point.

Recently, in order to improve such a disadvantage of said chelate resin, there has been proposed a process for producing a chelate resin having amidoxime groups by subjecting to polymerization a monomer mixture comprising a crosslinking agent selected from the group consisting of polyacrylates of polyalkylene polyols whose alkylene groups have 2 to 4 carbon atoms, and polymethacrylates of said polyols, and an ethylenically unsaturated compound having one or more nitrile groups, and then reacting the resulting polymer with hydroxylamine (Published Unexamined Japanese Patent Application No. 53,106/81). The improved chelate resin described above has an improved metal ion adsorption rate as compared with conventional resins having amidoxime groups but does not always have a sufficiently improved adsorption capacity for metal ions. Therefore, when a large amount of a liquid is subjected to adsorption treatment, the improved chelate resin is disadvantageous, for example, in that the amount treated per unit time decreases, that many treating apparatuses are needed, and that the construction and operation costs increase.

In consideration of these circumstances, in order to produce an amidoxime group type chelate resin having an excellent adsorption capacity and a high adsorption rate as compared with well-known amidoxime group type chelate resins, the present inventors have devoted themselves to investigations to accomplish this invention.

This invention provides a chelate resin having a functional group represented by the formula:

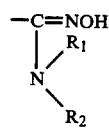   (I)

wherein $R_1$ and $R_2$ are each independently a hydrogen atom, an alkyl group, an aminoalkyl group, a phenyl group or substituted group thereof, and a functional group represented by the formula:

   (II)

wherein $R_3$ is an amino group, an alkylamino group, a polyethylenepolyamino group, a hydrazo group, a hydrazino group, a hydrazono group, an amidino group, a guanidino group, a semicarbazide group, or a substituted group thereof.

This invention further provides a process for producing the above-mentioned chelate resin, which comprises reacting a resin having nitrile groups with hydroxylamine and/or its derivative and an amino compound other than hydroxylamine and/or its derivative (hereinafter referred to merely as "the amino compound").

The chelate resin of this invention having in its resin substrate a functional group represented by the formula:

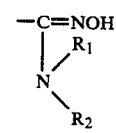   (I)

and a functional group represented by the formula:

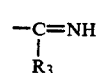   (II)

is characterized in that it has much larger metal ion adsorption ability than the well-known chelate resins having only amidoxime groups.

As the functional group represented by the formula (II), functional groups in which $R_3$ is an amino group, a hydrazino group, an alkylamino group having 1 to 4 carbon atoms, or a polyethylenepolyamino group having 2 to 10 carbon atoms and 2 to 6 nitrogen atoms, are preferred. Such a combination that $R_1$ and $R_2$ are each a hydrogen atom and $R_3$ is a hydrazino group or a polyethylenepolyamino group having 2 to 10 carbon atoms and 2 to 6 nitrogen atoms is particularly preferred. The equivalent ratio between the functional groups represented by each of the general formulas (I) and (II), i.e., (II)/(I), is preferably 0.1 to 1. When the equivalent ratio is less than 0.1, the effect of improving the adsorption ability for metal ions is insufficient. On the other hand, even when the equivalent ratio is increased, the effect of improving the adsorption ability for metal ions does not increase proportionately thereto, and therefore the equivalent ratio is usually adjusted to 1 or less.

The chelate resin of this invention can be produced by reacting a resin having nitrile groups with hydroxylamine and/or its derivative and the amino compound.

As the resin having nitrile groups used in the process of this invention, the following polymers, copolymers and resins can be usually used:

1. Polymers of a vinyl cyanide series monomer or copolymers of a vinyl cyanide series monomer and an ethylenically unsaturated monomer copolymerizable therewith. Examples of the vinyl cyanide series monomers are acrylonitrile, α-chloroacrylonitrile, vinylidene cyanide, methacrylonitrile, ethacrylonitrile, fumarodinitrile, crotononitrile, 2-cyanoethyl acrylate, 2-cyanoethyl methacrylate and the like. Examples of the ethylenically unsaturated monomer copolymerizable therewith are divinylbenzene, diethylene glycol dimethyacrylate, ethylene glycol dimethacrylate, polyethylene glycol dimethacrylate, vinyl acetate or the like.

2. Resins obtained by reacting a polymer having an amine-reactive group (hereinafter referred to as "the resin having an amine-reactive group") with a nitrile compound having one or more amino or imino groups. Examples of the amine-reactive group are a chloromethyl group, a sulfonyl chloride group, a carbonyl chloride group, an isocyanate group, an epoxy group, an aldehyde group and the like. Examples of the resins having an amine-reactive group are a styrene-divinylbenzene copolymer, a phenol resin, a polyethylene, a polypropylene, a polyvinyl chloride and the like. Examples of the nitrile compound having one or more amino groups or imino groups are aminoacetecitrile, aminomalononitrile, diaminomaleonitrile, dicyandiamide, iminodiacetonitrile, 1-amino-2-cyanoethane, 4-aminobenzonitrile, 1-amino-3-cyanopropane and the like. But, the resin having nitrile groups is not limited to those obtained from the above mentioned nitrile compounds.

There are particularly preferably used polymers of a vinyl cyanide series monomer such as acrylonitrile, methacrylonitrile, ethacrylonitrile, fumarylonitrile of vinylidene cyanide, or copolymers of any of these vinyl cyanide series monomers and divinylbenzene, diethylene glycol dimethacrylate, ethylene glycol dimethacrylate, polyethylene glycol dimethacrylate, vinyl acetate or the like.

The resin having nitrile groups is not particularly limited in its polymerization degree so long as it is insoluble in water, though in general, those having a polymerization degree of about 500 or more are preferably used.

As to the form of the resin having nitrile groups, resins in any of powder form, fiber form, honeycomb form, particle form, spherical form and liquid form may be used, and the form may properly be selected depending on purposes, though in general, spherical or powdery resins are preferably used from the viewpoint of handling.

As the hydroxylamine and/or the derivative thereof reacted in order to form amidoxime groups in the resin having nitrile groups which are used in practicing the process of this invention, any one may be used so long as it reacts with the nitrile groups to form amidoxime groups represented by the formula (I). As such hydroxylamine and/or derivatives thereof, there are exemplified hydroxylamine, N-methylhydroxylamine, N-ethylhydroxylamine, N-aminomethylhydroxylamine, N-phenylhydroxylamine, p-(hydroxylamino)phenol, o-acetylhydroxylamine, and hydrochlorides, sulfates, nitrates, phosphates, acetates and the like thereof.

As the amino compound used in order to impart a group of the formula (II) to the chelate resin in practicing the process of this invention, any one may be used so long as it reacts with the nitrile groups, has such basicity that it can react with acid ions in a liquid to form a salt, and forms a complex with a metal ion. As such an amino compound, there are exemplified, amines such as ammonia, methylamine, ethylamine, propylamine, butylamine and the like; hydrazine and its derivatives such as hydrazine, hydrazine hydrate, phenylhydrazine, p-hydrazinophenol p-hydrazinobenzoic acid, p-hydrazinobenzenesulfonic acid, 1-aminopiperazine, N-methylhydrazine, 11-oxa-3,4,7,8,14,15-hexaazaheptadecane-1,17-diol, acetaldehyde hydrazone, hydrazinoethanol, isothiosemicarbazide, thiocarbonohydrazide, semicarbazide and the like; azanes, azenes and derivatives thereof, such as triazane, triazene, tetrazane, tetrazene, tetrazadiene, pentazane, 1-methyltriazane, 1-methyl-3-propyltriazane, 3-methyltriazane, 3-methyl-1-tetrazene, ethyltetrazanoacetate and the like; amidine and its derivatives such as acetamidine, hexaneamidine, cyclohexanecarboxyamidine, p-amidino-1-benzoic acid and the like; guanidine and its derivatives such as guanidine, biguanide, 1,3-dimethylguanidine, 1,1,2-trimethylguanidine and the like; amidoxime and its derivatives such as formamidoxime, acetamidoxime, imidazole-2-carboxamide-o-ethyloxime, N-methylacetamidoxime and the like; amidrazone and its derivatives such as benzamide hydrazone, benzamido hydrazido imide, hydrazine, 2-thenohydrazide hydrazone, $N^2,N^4$-dimethyl-4-thiazolecarbohydrazide hydrazone, benzaldehyde hydrazone and the like; formazan and its derivatives such as formazan, 3-phenyl formazan, 1,3-diphenylformazan, 1,3-dimethylformazan and the like; and polyethylenepolyamines and their derivatives such as ethylenediamine, diethylenetriamine, triethylenetetramine, tetraethylenepentamine, pentaethylenehexamine, hexamethylenediamine, trimethylenediamine, tetramethylenediamine, pentaethylenediamine and the like.

The reaction of the resin having nitrile groups with the hydroxylamine and/or its derivative and the amino compound is usually effected by a method wherein the resin having nitrile groups is reacted with hydroxylamine and/or its derivative and the amino compound which coexist with each other, to form functional groups of each of the formulas (I) and (II) at the same time. Said reaction can also be effected by a method comprising previously reacting the resin having nitrile groups with hydroxylamine or its derivative, then adding the amino compound, and further allowing the resulting mixture to reaction, or by a method comprising previously reacting the resin having nitrile groups with the amino compound, and then reacting the reaction product with hydroxylamine and/or its derivative.

The reaction of the resin having nitrile groups with hydroxylamine and/or its derivative and the amino compound can be effected at ordinary temperatures (about 20° C.) to 150° C., preferably at 50° to 120° C. in the absence of a solvent or in the presence of a solvent. Examples of the solvent are water, methanol, ethanol, propanol, butanol, N,N-dimethylformamide, formamide, N,N-dimethyl sulfoxide, toluene, xylene, carbon tetrachloride, 1,2-dichloroethane and the like. When the reaction temperature is lower than ordinary temperatures, the reaction rate decreases, so that the reaction must be effected for a long time, and when the reaction temperature is higher than about 150° C., a phenomenon of the decomposition of the formed functional groups occurs. Therefore, such reaction temperatures are not preferable.

The reaction is effected at the temperature described above, usually for about 0.1 to 24 hours, preferably for 0.5 to 6 hours. But a still longer reaction time may be used. Although the reaction is usually effected at atmospheric pressure, it may be effected under pressure.

As to the reaction proportions of the hydroxylamine and/or the derivative thereof and of the amino compound to the resin having nitrile groups, it is sufficient that the hydroxylamine and/or the derivative thereof and the amino compound are used in amounts of 1/5 mole or more and 1/20 mole or more, respectively, per equivalent of the nitrile groups in the resin. However, since the employment of the reactants in larger amounts than are necessary is accompanied by recovery treatment after the reaction and hence makes the treatment procedure troublesome, the hydroxylamine and/or the derivative thereof and the amino compound are preferably used in amounts of the ranges from 2/5 to 10 moles and from 1/10 to 3 moles, respectively, per equivalent of the nitrile groups in the resin. When the reaction proportions of the hydroxylamine and/or the derivative thereof and of the amino compound to the resin having nitrile groups are smaller than those described above, the amounts of chelate-forming functional groups introduced decreases, so that the metal adsorption capacity of the resulting reaction product chelate resin decreases. Therefore, it is not desirable.

When the hydroxylamine and/or the derivative thereof used in the above-mentioned reaction is a salt with hydrochloric acid, sulfuric acid, nitric acid, phosphoric acid, acetic acid or the like, it is sufficient that the resin having nitrile groups is reacted with the hydroxylamine derivative and the amino compound in the presence, in the reaction system, of the same amount as said salt or more of sodium hydroxide, potassium hydroxide, a tertiary amine such as trimethylamine, triethylamine, pyridine, N,N-dimethylaniline or the like, or the aforesaid amino compound.

The reaction product produced in the manner described above may be used as a chelate resin as it is or after being washed and then dried.

The chelate resin produced by the process of this invention contains groups of each of the formula (I) and the formula (II) as main functional groups, and although the reason why the chelate resin produced by the process of this invention has a higher adsorption rate and a larger adsorption capacity than those of the heretofore well-known amidoxime type chelate resins is not apparent, it is presumed to be as follows.

That is to say, the reason is thought to be that in the reaction of the resin having nitrile groups with the hydroxylamine and/or the derivative thereof and the amino compound, owing to the electrical interaction between the amino compound and the nitrile groups in the resin, the reactivity of the hydroxylamine and/or the derivative thereof with the nitrile groups is improved as compound with that in a system free from the amino compound, resulting in an increase of the amount introduced of the functional group represented by the formula (I), and that owing to the interaction between the functional group represented by the formula (II), which is formed by the reaction of the nitrile groups with the amino compound, and the functional group represented by the formula (I), the chelate adsorption ability is increased as compared with that in the case where the functional group of the formula (I) alone is present.

The chelate resin produced by the process of this invention can very effectively be utilized for the adsorption and removal of metal ions such as uranium, gallium, indium, copper, iron, mercury, lead and the like.

According to the process of this invention described above in detail, there is such an advantage in that there can be produced a chelate resin having a high adsorption rate and large adsorption capacity as compared with the well-known amidoxime type chelate resins. Accordingly, when the chelate resin obtained by the process of this invention is used, the superficial velocity in column can be increased owing to the high adsorption rate and the large adsorption capacity: therefore said chelate resin is very effective for treating a large amount of a liquid, has advantages of, for example, low construction and operation costs of the treating facilities, and hence has a very high industrial value.

This invention is further explained below in more detail referring to Examples, wherein all parts and percents are by weight unless otherwise specified.

EXAMPLE 1

To 61 parts of a resin having nitrile groups, i.e. an acrylonitrile-divinylbenzene copolymer having a degree of crosslinking of 10 mole % and a particle size of 20 to 50 mesh were added 139 parts of hydroxylamine hydrochloride, 100 parts of hydrazine hydrate and 300 parts of water. The resulting mixture was reacted at 90° to 107° C. for 4 hours, followed by filtration and washing, to obtain 169 parts by weight (undried) of a chelate resin. In the chelate resin obtained, there were detected a functional group

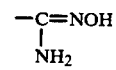

in an amount of 6.0 mole/liter resin and a functional group

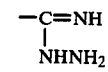

in an amount of 1.8 mole/liter resin. To 50 ml of an aqueous sodium aluminate solution containing 197 ppm of Ga obtained from the production process of alumina by the Bayer process was added 7 ml of the chelate resin obtained, and the resulting mixture was shaken for 20 hours and then separated into the chelate resin and an aqueous layer. The concentration of Ga remaining in the aqueous layer was measured to be 14 ppm. To 50 ml of enriched sea water containing 110 ppm of U was added 1 ml of the chelate resin obtained, and the resulting mixture was shaken for 20 hours and then separated into the chelate resin and an aqueous layer. The concentration of U remaining in the aqueous layer was measured to be 17 ppm.

EXAMPLES 2 to 13

A reaction was effected in the same manner as in Example 1, except that the hydrazine hydrate, i.e., the amino compound used in Example 1 and the used amount thereof were replaced by the individual amino compounds and amounts shown in Table 1, to synthesize a chelate resin. The thus obtained chelate resins were subjected to performance characteristic tests. The results are shown in Table 1.

TABLE 1

| Example | Amino compound Kind | Amount parts | Yield (dried) parts | Chelate resin Functional group (I) mole/liter resin | | Functional group (II) mole/liter resin | | Adsorption ability test Ga (ppm) | U (ppm) |
|---|---|---|---|---|---|---|---|---|---|
| 2 | p-Hydrazino-phenol | 186 | 153 | —C(=NOH)NH₂ | 4.6 | —C(=NH)NHNH-C₆H₄-OH | 1.1 | 27 | 21 |
| 3 | 2-Hydrazino-ethanol | 114 | 167 | " | 5.6 | —C(=NH)NHNHCH₂CH₂OH | 1.7 | 19 | 21 |
| 4 | Guanidine | 89 | 154 | " | 5.8 | —C(=NH)HNC(=NH)—NH₂ | 1.8 | 12 | 14 |
| 5 | 1,1,2-Tri-methylguanidine | 152 | 183 | " | 5.8 | —C(=NH)HN—C(=N—CH₃)N(CH₃)₂ | 1.7 | 13 | 14 |
| 6 | Formamidoxime | 90 | 147 | " | 4.9 | —C(=NH)HNCH=NOH | 1.5 | 23 | 20 |
| 7 | Formhydrazide | 81 | 147 | " | 4.9 | —C(=NH)HNNHCOH | 1.5 | 24 | 21 |
| 8 | Formamidine | 66 | 153 | " | 5.0 | —C(=NH)HNCH=NH | 1.5 | 21 | 19 |
| 9 | Benzaldehyde hydrazone | 180 | 143 | " | 4.7 | —C(=NH)HNN=CH-C₆H₅ | 1.2 | 28 | 23 |
| 10 | Ethylenediamine | 90 | 156 | " | 5.8 | —C(=NH)HNCH₂CH₂NH₂ | 1.7 | 15 | 15 |
| 11 | Diethylenetri-amine | 155 | 184 | " | 5.9 | —C(=NH)HN(CH₂CH₂NH)₂H | 1.7 | 13 | 14 |
| 12 | Triethylene-tetramine | 219 | 189 | " | 5.9 | —C(=NH)HN(CH₂CH₂NH)₃H | 1.6 | 13 | 14 |
| 13 | Semicarbazide | 144 | 153 | " | 4.8 | —C(=NH)HNNHCONH₂ | 1.4 | 25 | 27 |

EXAMPLE 14

To 82 parts of a resin having nitrile groups, i.e., vinylidene cyanide-divinylbenzene having a degree of cross-linking of 8 mole % and a particle size of 20 to 50 mesh were added 164 parts of hydroxylamine sulfate, 267 parts of a 30% aqueous sodium hydroxide solution and 103 parts of diethylenetriamine. The resulting mixture was reacted at 90° to 103° C. for 2 hours, followed by filtration and washing, to obtain 284 parts (undried) of a chelate resin. In the chelate resin obtained, there were detected a functional group

—C(=NOH)NHNH₂

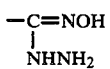

in an amount of 9.8 mole/liter resin, and a functional group

—C(=NH)NH(CH₂CH₂NH)₂H

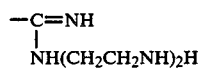

in an amount of 3.0 mole/liter resin. Performance characteristic tests on the resin obtained were carried out by the same methods as in Example 1 to find that the Ga concentration in the aqueous layer was 3 ppm and the U concentration therein 5 ppm.

EXAMPLES 15 to 18

A reaction was effected in the same manner as in Example 14, except that the kind and amount of the resin having nitrile groups were replaced by the individual resins and amounts shown in Table 2, to synthesize a chelate resin. The thus obtained chelate resins were subjected to performance characteristic tests. The results are shown in Table 2.

in an amount of 5.3 mole/liter resin, and a functional group

TABLE 2

| | Resin having nitrile group | | Chelate resin | | | | Adsorption ability test | |
|---|---|---|---|---|---|---|---|---|
| Example | Kind | Amount parts | Yield (undried) parts | Functional group (I) mole/liter resin | | Functional group (II) mole/liter resin | | Ga (ppm) | U (ppm) |
| 15 | Methacrylonitrile-divinylbenzene copolymer having a degree of crosslinking of 6 mole % and a particle size of 20 to 50 mesh | 75 | 220 | —C=NOH<br>\|<br>NH₂ | 6.0 | —C=NH<br>\|<br>HN(CH₂CH₂NH)₂H | 2.1 | 11 | 12 |
| 16 | Acrylonitrile-diethylene glycol dimethacrylate copolymer having a degree of crosslinking of 20 mole % and a particle size of 20 to 50 mesh | 86 | 243 | " | 5.1 | " | 1.8 | 16 | 17 |
| 17 | Acrylonitrile-ethylene glycol dimethacrylate copolymer having a degree of crosslinking of 25 mole % and a particle size of 20 to 50 mesh | 83 | 237 | " | 4.8 | —C=NH<br>\|<br>HN(CH₂CH₂NH)₂H | 1.7 | 22 | 23 |
| 18 | Polyacrylonitrile fiber | 56 | 147 | " | 6.4 | " | 2.2 | 10 | 12 |

EXAMPLE 19

To 67 parts of a resin having nitrile groups, i.e., an acrylonitrile-divinylbenzene copolymer having a degree of crosslinking of 10 mole % and a particle size of 20 to 50 mesh were added 94 parts of N-methylhydroxylamine, 50 parts of hydrazine hydrate and 400 parts of water. The resulting mixture was reacted at 70° to 103° C. for 6 hours, followed by filtration and washing to obtain 224 parts (undried) of a chelate resin. In the chelate resin obtained, there were detected a functional group

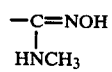

—C=NOH
 |
 HNCH₃ in an amount of 2.3 mole/liter resin. Performance characteristic tests on the resin obtained were carried out by the same methods as in Example 1 to find that the Ga concentration in the aqueous layer was 18 ppm and the U concentration therein 23 ppm.

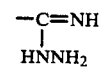

—C=NH
 |
 HNNH₂

EXAMPLES 20 to 23

A reaction was effected in the same manner as in Example 19, except that the kinds and amounts of the hydroxylamine derivative and the amino compound used in Example 19 were changed as shown in Table 3, to synthesize a chelate resin. The thus obtained chelate resins were subjected to performance characteristic tests. The results are shown in Table 3.

TABLE 3

| | Hydroxylamine derivative | | Amino compound | | | Chelate resin | | | | Adsorption ability test | |
|---|---|---|---|---|---|---|---|---|---|---|---|
| Example | Kind | Amount parts | Kind | Amount parts | Yield (dried) parts | Functional group (I) mole/liter resin | | Functional group (II) mole/liter resin | | Ga (ppm) | U (ppm) |
| 20 | N—Ethyl-hydroxyl-amine | 183 | Hydrazine | 32 | 270 | —C=NOH<br>\|<br>HNC₂H₅ | 4.9 | —C=NH<br>\|<br>NHNH₂ | 2.4 | 21 | 26 |
| 21 | Hydroxyl-amine hydro-chloride | 69 | Acetamidine | 116 | 207 | —C=NOH<br>\|<br>NH₂ | 5.8 | —C=NH<br>\|<br>HN—C(=NH)CH₃ | 1.3 | 16 | 19 |

TABLE 3-continued

| | Hydroxylamine derivative | | Amino compound | | Chelate resin | | | Adsorption ability test | |
|---|---|---|---|---|---|---|---|---|---|
| Example | Kind | Amount parts | Kind | Amount parts | Yield (dried) parts | Functional group (I) mole/liter resin | Functional group (II) mole/liter resin | Ga (ppm) | U (ppm) |
| 22 | N—amino-methyl-hydroxylamine | 126 | Semi-carbazide | 75 | 243 | —C=NOH<br>\|<br>HNCH$_2$NH$_2$   5.9 | —C=NH<br>\|<br>HNNHCONH$_2$   0.8 | 18 | 21 |
| 23 | Hydroxyl-amine | 99 | 1-Amino-piperazine | 87 | 222 | —C=NOH<br>\|<br>NH$_2$   6.1 |    1.4 | 18 | 23 |

COMPARATIVE EXAMPLE 1

A reaction was effected in the same manner as in Example 1, except tht the hydrazine hydrate used in Example 1 was replaced by 80 parts of sodium hydroxide, to synthesize a chelate resin. As a result, 147 parts (undried) of the chelate resin was obtained. In the chelate resin obtained, there were detected a functional group

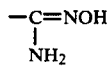

in an amount of 2.2 mole/liter resin.

Performance characteristic tests on the chelate resin obtained were carried out by the same methods as in Example 1 to find that the concentration of Ga remaining in the aqueous layer was 89 ppm and the U concentration 34 ppm.

COMPARATIVE EXAMPLE 2

A reaction was effected in the same manner as in Example 14, except that 86 parts of an acrylonitrilediethylene glycol dimethacrylate polymer having a degree of crosslinking of 20 mole % and a particle size of 20 to 50 mesh was used as a resin having nitrile groups and that 103 parts of the diethylenetriamine was omitted, to synthesize a chelate resin. As a result, 211 parts (undried) of the chelate resin was obtained. The chelate resin obtained contained a functional group

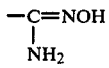

in an amount of 1.9 mole/liter resin. Performance characteristic tests on the chelate resin obtained were carried out by the same methods as in Example 1 to find that the concentration of Ga remaining in the aqueous layer was 93 ppm and the U concentration 32 ppm.

COMPARATIVE EXAMPLE 3

Adsorption capacity tests on Duolite CS-346 (manufactured by Diamond Shamrock Corp.), a commercially available chelate resin having amidoxime groups were carried out by the same methods as in Example 1 to find that the concentration of Ga remaining in the aqueous layer was 114 ppm and the U concentration 37 ppm.

From Examples 1 to 23 Comparative Examples 1 to 3, it is clear that the chelate resins obtained by effecting the reaction of a resin having nitrile groups with hydroxylamine and/or its derivative according to the process of this invention in the presence of an amino compound have a higher adsorption rate and a larger adsorption capacity for metal ions than those of amidoxime group type chelate resins produced by a well-known process. Thus, the present invention is industrially very useful.

What is claimed is:

1. A process for preparing a chelate resin having a functional group represented by the formula:

wherein R$_1$ and R$_2$ are each independently a hydrogen atom, an alkyl group, an aminoalkyl group, or a phenyl group and a functional group represented by the formula:

$$-C=NH \atop |\ \ R_3 \qquad (II)$$

wherein R$_3$ is an amino group, an alkylamino group, a polyethylenepolyamino group, a hydrazo group, a hydrazino group, a hydrazono group, an amidino group, a guanidino group, or a semicarbazide group, the equivalent ratio of the functional group of the formula (II) to that of (I), (II)/(I), being 0.1 to 1, which comprises reacting a resin having nitrile groups with hydroxylamine and/or a derivative thereof and an amino compound other than said hydroxylamine and said derivatives thereof.

2. A process according to claim 1, wherein the proportions of the hydroxylamine and/or the derivative thereof and the amino compound to the resin having nitrile groups used are 1/5 mole or more of hydroxylamine and/or the derivative thereof and 1/20 mole or more of the amino compound per equivalent of the nitrile groups.

3. A process according to claim 1, wherein the reaction is carried out at a temperature of 20° to 150° C.

* * * * *